3,343,924
SELECTIVE DECLADDING OF NUCLEAR
FUEL ELEMENTS
Louis J. Anastasia, Midlothian, Ill., Peter G. Alfredson, Sydney, New South Wales, Australia, and Martin J. Steindler, Park Forest, Ill., assignors to the United States of America as represented by the United States Atomic Energy Commission
No Drawing. Filed Sept. 30, 1966, Ser. No. 584,057
2 Claims. (Cl. 23—324)

ABSTRACT OF THE DISCLOSURE

A process for selectively removing stainless steel or zircaloy from an oxidic fuel clad in stainless steel or zircaloy consisting of reacting the fuel assembly with a gas mixture of at least two parts by volume of hydrogen fluoride to one part by volume of oxygen.

---

The invention described herein was made in the course of, or under, a contract with the United States Atomic Energy Commission.

This invention relates to the destructive removal of zircaloy or stainless steel cladding material and more specifically to the selective destructive removal of these materials from a nuclear fuel element comprising an oxidic nuclear fuel clad in zircaloy or stainless steel. Zircaloy is a complex alloy containing zirconium and, in various modifications, smaller quantities of tin, iron, chromium, and other metallic constituents.

In most nuclear power reactors the fuel material must be physically separated from the coolant. For if the coolant is water, contact between the fuel and the coolant would result in corrosion of the fuel, and if the coolant is liquid metal, even if no chemical reaction took place, intense radioactivity would be imparted to the coolant by contact with irradiated fuel material. It is therefore imperative that the fuel material be protected from contact with the coolant, and this is usually accomplished by cladding the fuel in a material comparatively nonreactive to both the fuel and the coolant. Two such materials, and the most used, are zircaloy and stainless steel.

Reactor economics are such that the fuel elements must be replaced while the majority of usable fuel remains; obviously, reprocessing the replaced fuel element for the unused fuel is extremely important. Of the many major problems encountered in this area, not the least is the removal of the cladding material from the entire fuel assembly and the separation of the fuel from the removed cladding. Many such processes are based upon the simultaneous chemical destruction of the cladding and fluorination of the fuel material to the volatile hexafluoride. Some of these operations are performed in fluidized beds, and clogging of the exit lines, agglomeration of the bed material, general deterioration of the heat-transfer characteristics of the bed, and fuel retention by the bed material are some of the problems encountered with these processes.

Heretofore, separation of fuel and cladding has been accomplished by reacting the fuel element with mixtures of hydrogen fluoride and oxygen. This gas mixture not only destructively removes the cladding material by reacting with it but also oxidizes the fuel and converts the oxidized fuel to intermediate fluorides. While this system is workable and has its advantages, it has certain disadvantages, particularly when applied to an oxidic fuel clad in stainless steel. In that case, certain fluorides are formed from the stainless steel which are volatile, and they contaminate the subsequent hexafluoride removal of the fuel material. These same volatile fluorides tend to clog the exit lines of the system, and nonvolatile fluorides remain in the bed and not only retain plutonium values, when they are present, but also tend to agglomerate, thus reducing the heat-transfer characteristics of the bed. The latter difficulty is particularly disadvantageous in that it reduces the over-all process efficiency for plutonium separation.

It has been discovered that a gas mixture having certain ratios of hydrogen fluoride to oxygen in contact with oxidic fuel assemblies has the property of destructively removing the cladding material by reaction but not reacting with the oxidic fuel. This is advantageous in that it permits, if desired, a two-step recovery process. That is, a first step of destructively removing the cladding material and separating the remaining fuel from the cladding debris, then a second step of reacting the fuel to the desired form.

The process of this invention thus comprises reacting an oxidic nuclear fuel clad in stainless steel or zircaloy with a mixture of hydrogen fluoride and oxygen wherein the ratio by volume of hydrogen fluoride to oxygen is not less than about 2:1. This reaction results in the destruction of the cladding material while the oxidic fuel remains intact. The process has an additional advantage when applied to an oxidic fuel in which the fuel is not in the most positive valence state. For instance, if the fuel is uranium dioxide, then during the selective reaction of the cladding material the uranium dioxide is not converted to $U_3O_8$, a substantial advantage because, although $U_3O_8$ is less dense, and therefore easier to fluidize, it spalls off the surface of the fuel pellets as fine particles which intimately mix with the fluid bed particles, thereby preventing the separation of fuel pellets and bed particles by sieving. If the fuel pellets remain substantially intact, their separation from the bed particles is not difficult. The invention is further explained in the following examples.

Various experiments were run wherein uranium dioxide was contacted with different combinations of hydrogen fluoride and oxygen at various temperatures in order to determine what concentrations of hydrogen fluoride and oxygen would be reactive to uranium dioxide. During these experiments it was noted that for some ratios of hydrogen fluoride to oxygen no reaction with uranium dioxide took place. Initially, these results were ignored, but they since have formed the basis for the process of this invention. The experiments were carried out in a two-inch-diameter fluid bed reactor with a uranium dioxide bed depth of about two inches, a bed support consisting of nickel spheres and several different types of fluidized bed material. The following table summarizes the results of the experiment in which the various combinations of hydrogen fluoride, oxygen and a carrier gas were contacted with uranium dioxide. It will be noted that Runs 1 and 9 produced no reaction between the gas mixture and uranium dioxide. It is these runs in combination with the known ability of mixtures of hydrogen fluoride and oxygen to react with stainless steel and zircaloy that form the basis of this invention.

| Run | Temp. (° C.) | Reactant Concentration to Pellet Bed | | Comments |
|---|---|---|---|---|
| | | HF (v/o) | O$_2$ (v/o) | |
| 1 | 550 | 47 | 12 | No reaction. |
| 2 | 550 | 42 | 58 | Cake after 0.5 hr. reaction. |
| 3 | 550 | 33 | 60 | Pellets contained in basket, satisfactory reaction. |
| 4 | 550 | 46 | 46 | |
| 5 | 400 | 40 | 60 | Satisfactory reaction, partial cake during run. |
| 7 | 400 | 42 | 58 | Cake during 2.4 hr. of reaction. |
| 9 | 400 | 21 | 10 | No reaction. |
| 10 | 400 | 19 | 28 | Approximately 50% reaction. |
| 11 | 450 | 19 | 29 | Satisfactory reaction. |

Although the process of this invention is preferably carried out in a fluidized bed, it is not necessary for operability. Initial reaction of the cladding material and the hydrogen fluoride-oxygen mixture seems to produce fluoride coatings which tend to slow down the reaction rate. When the cladding material is in a fluidized bed, the physical agitation of the bed particles aids in the removal of the fluoride coatings and greatly improves the reaction rate. Additionally, the reaction rate is further controlled by the bed particle agitation which helps maintain isothermal conditions in the bed by removing the heat of reaction. It is for these reasons that the fluidized bed is preferred.

As an example of the complete process, a tubular fuel element having a mixture of uranium and plutonium dioxides for fuel material and clad in stainless steel is inserted into a fluidized bed. The bed is formed of particles inert to the fuel element and the fluidizing gases, such as alumina, and is fluidized with a mixture of hydrogen fluoride and oxygen with an inert gas added where the flow rates so require. The bed is heated to between 400 and 650° C. and the fluidizing gas is adjusted so that the ratio by volume of hydrogen fluoride to oxygen is no less than 2:1. As the reaction proceeds, nonvolatile compounds of chromium, nickel and iron separate from the cladding material and remain as powders in the bed. When the stainless steel is completely reacted, the intact fuel particles of uranium dioxide and plutonium dioxide are sieved from the rest of the bed and transported to a second reactor with a fresh bed of alumina not contaminated with chromium, nickel and iron fluorides. In the second reactor various combinations of hydrogen fluoride or fluorine gas with other known reactants may be utilized to convert the uranium dioxide and plutonium dioxide to the corresponding hexafluorides.

It will be understood that the invention is not to be limited to the details given herein but that it may be modified within the scope of the appended claims.

The embodiments of the invention in which an exclusive property or privilege is claimed are defined as follows.

What is claimed is:

1. A process for decladding an assembly of uranium dioxide or mixtures of uranium and plutonium oxides clad in stainless steel or an alloy consisting essentially of zirconium and containing minor amounts of nickel, or chromium, or tin, or iron, or combinations thereof comprising reacting the assembly with a gas containing oxygen and hydrogen fluoride in the ratio of at least two parts hydrogen fluoride to one part oxygen by volume in a fluidized bed of particles inert to the assembly and the reacting gas at a temperature between about 400° C. and about 650° C. and separating the unreacted uranium dioxide or mixture of uranium and plutonium oxides from the reaction products.

2. A process according to claim 1 wherein the temperature of operation is 550° C. and the reactant gas consists of 47 volume percent hydrogen fluoride and 12 volume percent oxygen, the balance being a carrier gas.

References Cited

UNITED STATES PATENTS 3,303,004  2/1967  Bennett et al. _____ 23—324

OTHER REFERENCES

Reactor Fuel Processing, vol. 8, No. 1, p. 22 (1964–1965).

Reactor Fuel Processing, vol. 9, No. 1, pp. 22–27 (1965–1966).

CARL D. QUARFORTH, *Primary Examiner.*

S. TRAUB, R. L. GRUDZIECKI, *Assistant Examiners.*